March 3, 1970        G. A. SEEGERS        3,498,012
STAIR TREAD WITH RISER LOCKING MEANS
Filed Jan. 31, 1968
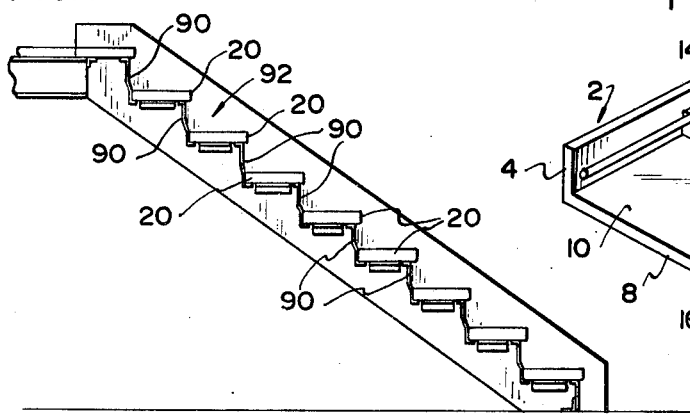
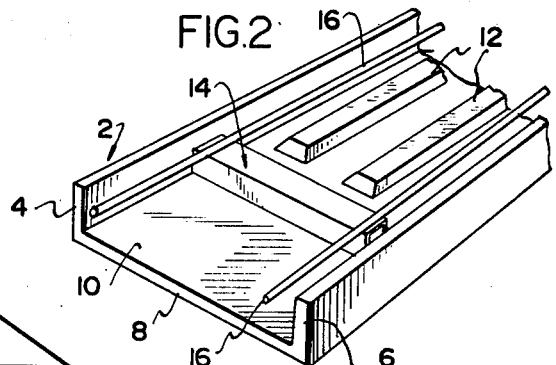
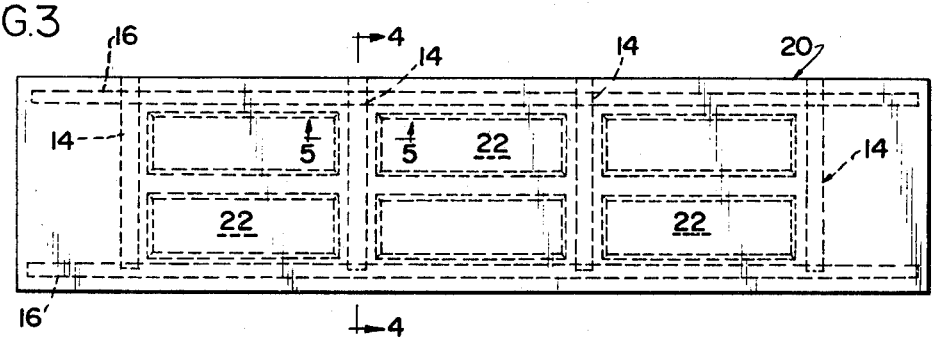
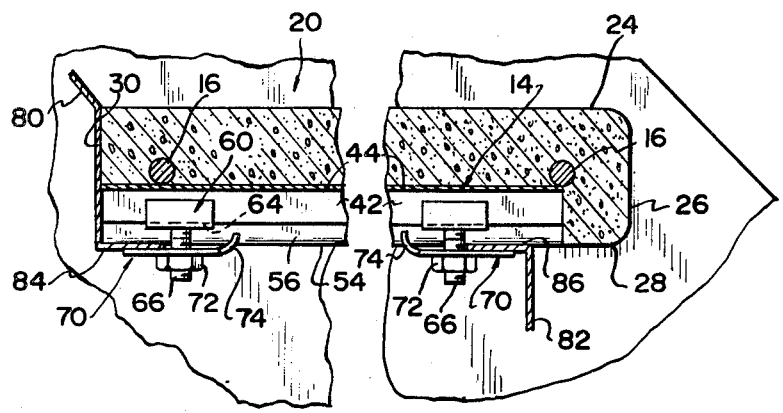
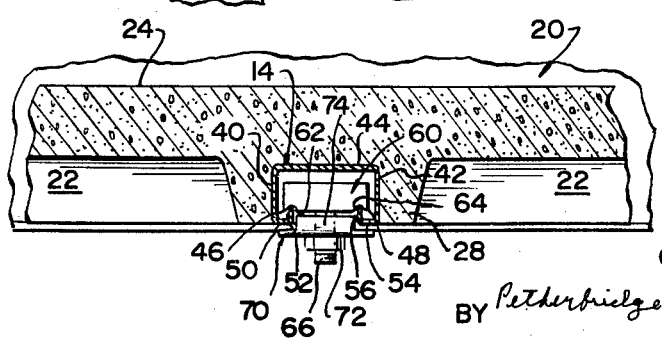
INVENTOR.
GLEN A. SEEGERS
BY Petherbridge, O'Neill & Aubel
ATTORNEYS.

United States Patent Office 3,498,012
Patented Mar. 3, 1970

3,498,012
STAIR TREAD WITH RISER LOCKING MEANS
Glen A. Seegers, 357 N. Charlotte,
Lombard, Ill. 60148
Filed Jan. 31, 1968, Ser. No. 701,991
Int. Cl. E04f 11/00; E04b 1/38
U.S. Cl. 52—189
12 Claims

ABSTRACT OF THE DISCLOSURE

The application is directed to structures and methods for producing pre-formed stair treads which are readily assembleable into complete stair units. The stairs are prodced utilizing a mold designed to minimize the weight of individual star treads, to reinforce such treads, and to provide them with an essentially integral locking device for connecting each of the treads to a riser assembly. Each prefabricated stair tread is reinforced and of a minimum weight and is ready for installation in a variety of stair unit environments. The stair tread locking devices employed are connected to a tread in a manner permitting their movement on the undeside of the tread to obtain proper alignment of locking device with a particular riser element and permitting the removal of a locking device from the stair tread when necessary. A number of stair treads can be connected in ascending or descending relationship to a combination of stringers and interconnected risers.

---

The subject matter of this invention is directed to means and methods for producing preformed or precast stair treads which are versatile and can be widely used in the construction of a variety of stair units.

It was desired to develop a stair tread mold which could be effectively used in molding a reinforced relatively light weight, and thereby easy to handle, stair tread. The mold of the invention was designed to effectuate these objectives and to provide for molding a portion of a locking element essentially integrally into the body of a stair tread. The mold is further designed to enable the production of substantial voids in the stair tread body following the hardening of the mold material to reduce the weight of the stair tread without producing a corresponding sacrifice in the strength of the tread.

The molding method of the invention utilizes a mold of the type described above. Channel elements are placed in preselected locations on the base of the mold, as are reinforcing elements. The molding material is then introduced into the mold and is permitted to harden. When the mold material has hardened, the channel and reinforcing elements become essentially integral with the completed stair tread.

The completed stair tread, through the molding process, is equipped with a downwardly opening channel bounded at its lowermost extremity by walls for supporting a first locking plate which spans the open channel and is moveable longitudinally therein for adjustment or for complete removal. A shaft is secured to the first plate and depends therefrom through the channel opening. The end of the shaft opposite the plate is threaded to receive an adjustment nut. A second plate spans the channel opening adjacent the walls defining the channel and the threaded end of the shaft projects through the channel. A nut applied to the threaded end of the shaft will cause the first plate to be urged against the walls supporting it and will cause the second plate to be urged against the walls on the bottom of the stair tread bordering the channel. When a riser element is interposed between the second plate and the bottom of the tread, tighetning of the nut will produce the compressive locking of the riser to the stair tread.

By employing a pair of such first and second locking plates in each of the preformed stair tread channels, the tread may be rigidly secured to a pair of spaced co-operating risers. And, groups of such treads can be secured to preformed riser-stringer assemblies to produce a complete stair unit. Individual stair treads may also be removed without difficulty when required from such assemblies.

Various other objects and advantages of the invention shall become more fully apparent from the following drawings and description which describe the best modes presently contemplated for carrying out the invention.

FIGURE 1 is a side elevation of a stair unit of the invention;

FIGURE 2 is a fragmentary perspective view of a stair tread mold of the invention;

FIGURE 3 is a top plan view of a stair tread of the invention;

FIGURE 4 is a fragmented cross-sectional view of the stair tread of FIGURE 3 taken along lines 4—4 thereof; and FIGURE 5 is a fragmentary cross-sectional view particularly illustrating the stair tread channel and locking device of the invention as shown in FIGURE 3 and taken along lines 5—5 thereof.

Referring now to the tread mold, generally designated 2, illustrated in FIGURE 2 for producing pre-formed stair treads, it can be seen that the cavity of the tread mold is formed between sidewalls 4 and 6 and bottom wall 8 of the mold body. The uppermost surface 10 of the bottom wall 8 is provided with a plurality of longitudinally aligned raised portions 12 which are positioned on surface 10 of wall 8 in generally parallel alignment. While only a pair of the raised portions 12 is shown in FIGURE 2, it is understood that more or less of these may be employed to produce a predetermined void content in the completed stair tread. It is preferred that these raised portions 12 are formed as an integral part of the bottom wall 8 of the mold cavity.

Still referring to the tread mold of FIGURE 2, one of a plurality of channel elements, generally designated 14, is removeably positioned on the upper surface 10 of bottom wall 8. One of the ends of the channel element 14 is positioned in abutting relationship with sidewall 4 while the opposite end thereof is spaced inwardly from the opposite sidewall 6. In the illustrated embodiment of the mold of the invention, the removable channel element 14 is positioned at generally right angles to the plane of the parallel sidewalls 4 and 6 and to the longitudinal axis of raised portions 12. Further, although only a single channel element is illustrated within tread mold 2, it is to be understood that under normal circumstances a plurality of such channel elements will be disposed in a tread mold cavity in parallel-spaced alignment for reasons to be discussed more fully below.

A plurality of reinforcing rods 16 are removably placed in the cavity of tread mold 2 as illustrated in FIGURE 2. These rods are disposed in generally parallel alignment with the longitudinal axis of the stair tread to be molded and are supported upon at least a pair of the spaced channel elements 14.

Following the preparation of the tread mold 2 for the molding of a stair tread of the invention, a moldable material, such as concrete, cement, plastic, combinations of the above, or other material which can be poured into a mold and subsequently hardened, is introduced into the cavity of tread mold 2, as defined by side walls 4 and 6 and bottom wall 8. The mold material is poured or otherwise introduced into mold 2 in an amount sufficient to fill the cavity thereof. The mold material flows over raised portions 12, channel elements 14, and flows around reinforcing rods 16. The ends of channel elements 14 spaced inwardly from wall 6 of the tread mold 2 are plugged to prevent the flow of mold material into the channels thereof.

After the mold material has been permitted to set, harden or cure, the stair tread may be removed from the mold cavity and preparations made for the subsequent molding of another tread.

A completed stair tread, generally designated 20, is illustrated in a top plan view in FIGURE 3. In this view it can be seen that the tread has a typical stair tread configuration, having a generally elongated rectangular shape. The orientation of the basic elements of the preformed molded stair tread can be readily obserevd in FIGURE 3. The reinforcing rods 16 are shown to be positioned in longitudinally-spaced parallel alignment being supported on and located at generally right angles to four channel elements 14, which elements are located in planes generally transverse to the longitiudinal axis of the stair tread and generally normal to the back wall of the tread. Spaced between adjacent pairs of the channel elements 14 are voids or cavities 22 formed by the projection of raised portions 12 from the surface 10 of bottom wall 8 of the tread mold 2. These voids are designed to reduce the amount of molding material required for the production of each stair tread, to reduce the weight of the preformed molded stair tread without a consequential sacrifice in the overall strength of an individual stair tread.

Referring now to the cross-sectional view of a stair tread 20, illustrated in FIGURE 4, it can be seen that the tread includes a top surface 24, a front or leading edge surface 26, a bottom or under surface 28, and a back surface 30 with each of the surfaces being disposed in generally normal relationship with adjacent surfaces providing a generally rectangular cross-sectional appearance. A channel element, generally designated 14, is shown to extend from back surface 30 of the stair tread 20 forward along the bottom of the tread to a point terminating short of the front or leading edge 26 of the stair tread. It is also apparent in this view that the channel element 14 opens through the bottom or under surface 28 of the stair tread.

The channel element 14 and the locking device used in connection therewith are shown with greater specificity in FIGURES 4 and 5. The end of channel element 14 adjacent back surface 30 of the stair tread 20 is open to permit attachment of locking devices.

The cross-section of the channel element 14 is best illustrated in FIGURE 5. In cross-section, the channel defines a generally inverted U-shaped configuration consisting of a pair of vertically-extending legs 40 and 42 which are aligned in spaced parallel relationship. These legs are connected by a base 44 which completes the generally U-shaped configuration of the channel element.

The extremities of legs 40 and 42 adjacent bottom or under surface 28 of the stair tread 20 are bent back upon themselves inwardly into the channel provided between legs 40 and 42 and base 44. These bent-back extremities of legs 40 and 42 serve to provide secondary upwardly extending U-shaped channels 46 and 48. Upwardly opening U-shaped channel 46 is defined by leg 40 which is bent to form secondary channel base 50 and secondary channel leg 52. The upwardly opening channel 48 is defined by vertical leg 42 which is bent to form secondary base 54 and secondary leg 56.

As can be best seen in FIGURE 5, the upstanding spaced secondary legs 52 and 56, which are positioned in generally parallel alignment, serve as supports for a first plate or locking member, generally designated 60. As can be seen from both FIGURES 4 and 5, locking member 60 has a generally rectangular configuration. However, the lower surface of the first plate or locking member 60 is provided with a pair of laterally-spaced serrated grooves 62 and 64 which extend in the channel member 14 in a direction generally parallel to the longitudinal axis of the channel member. These serrated grooves 62 and 64 are positioned for alignment with an engagement with the uppermost edges of the upstanding walls 52 and 56 of the channel member and are supported thereby.

A threaded rod 66 is secured to the first plate or locking member 60 and extends from the lower surface thereof downwardly through the slot provided between opposed generally parallel secondary legs 52 and 56. A second plate or locking member 70 is positioned beneath the first plate 60 with the lateral extremities thereof spanning the slot provided between secondary legs 52 and 56 and overlapping the secondary bases 50 and 54, which defined the upwardly opening channels 46 and 48 of the channel element 14.

The threaded rod 66 is made to project through an opening provided in the second plate or locking member 70. A nut 72 threaded to the extremity of the rod 66 serves to produce the movement of the second plate or locking member 70 upwardly towards the first plate 60 and into locking engagement with the channel element 14 when nut 72 is threaded upwardly. By loosening the nut 72, the second plate or locking member 70 is permitted to drop from locking engagement relationship with the channel element 14.

To facilitate alignment of the second plate or locking member 70 with respect to the slot provided between secondary legs 52 and 56, the plate is provided with an upwardly extending flange 74 which has a width just slightly smaller than that of the slot formed between secondary walls 52 and 56 thereby permitting the flange to be introduced into the slot between the legs to guide the second plate or locking member 70 into proper longitudinally aligned relationship with respect to the channel element 14 and to prevent the undesired turning of the second plate 70 as the nut 72 is tightened against the plate.

When the nut 72 is threaded vertically downwardly on rod 66, the assembly of the first and second plate or locking members 60 and 70 is loosened. This not only permits the locking member assembly to be moved along the longitudinal axis of the channel member but also permits the removal of the assembly through the open end of the channel adjacent the back wall 30 of stair tread 20.

Referring now to particularly to FIGURE 4, it can be seen that an upper riser member 80 and a lower riser member 82 are provided for the securement of a stair tread 20 thereto. The upper riser member 80 is provided with a generally horizontally extending flange 84. As shown in FIGURE 4, the loosely conected first plate or locking member 60 and second plate or locking member 70 can be moved along the longitudinal axis of the channel element 14 after the back surface 30 and bottom or under surface 28 of stair tread 20 has been positioned in supporting contact with the riser 80 and flange 84 thereof. The plates are then moved into locking relationship with the flange 84 of riser member 80. This is accomplished when the second plate or locking member has been aligned in overlapping relationship with the flange 84 of the riser member 80. By tightening nut 72 and threaded rod 66, the second plate 70 is drawn into locking engagement with the flange 84 of the riser 80 while simultaneously pulling the first plate 60 firmly down against the uppermost edges of secondary legs 52 and 56 thereby providing locking engagement between the stair tread 20 and the upper riser member 80.

A similar result may be achieved in connection with the lower riser member 82 and the generally horizontal flange 86 thereof. Again, the second plate or locking member 70 is tightened into locking engagement with the flange 86 in cooperation with a first plate 60 and the upper edges of walls 52 and 56 of the channel element 14.

As can be best seen in FIGURE 1, a plurality of stair treads 20 of the invention may be removeably connected to a plurality of flanged riser elements 90, which are secured, for example by welding, to a sutiable metal stringer member 92. The method of assembling a stair unit of the type illustrated in FIGURE 1 can readily employ groups of the locking members 60 and 70 in channels 14 of the stair treads to removeably lock the treads to the flange portions of the riser elements thereby forming a rigid stair structure with the stringer member 92.

Various modes of carrying out the invention are contemplated as being within the scope of the following claims which particularly point out and distinctly claim the subject matter regarded as the invention.

I claim:

1. A stair unit comprising a stringer member, a plurality of riser members secured to the stringer member in spaced descending relationship, some of the riser members being formed with a generally straight body section and having flange sections at the extremities of the straight section and extending generally normally from the body section in opposed relationship with respect thereto, at least one molded stair tread supported upon the lower flange section of one riser and the upper flange section of the next adjacent riser, the stair tread having a body means on the bottom surface of the body of the stair tread defining a channel, the channel defining means overlapping the flanges upon which the stair tread is supported, means provided in the channel of the body for engagement with locking means for securing the stair tread to the risers, and means engageable with the channel means for securing the stair tread to the risers.

2. The stair unit of claim 1 wherein a plurality of the stair treads thereof are secured to a plurality of risers in descending relationship with respect to the stringer member.

3. The stair unit of claim 2 wherein the means provided on the bottom surfaces of the plurality of stair tread bodies defining channels defines a plurality of elongated spaced channels in each of the stair tread bodies, means being provided in each of the channels for engagement with locking means for securing the stair treads to risers.

4. The stair unit of claim 3 wherein the means in the channels for locking means engagement are elongated channel elements molded into the stair treads and being substantially integral therewith.

5. The stair unit of claim 4 wherein the elongated channel elements have a generally inverted U-shaped configuration opening downwardly from each of the treads and with the legs thereof extending downwardly toward the bottom surface of the bodies, the extremities of the legs of each of the channel elements, being bent back upon themselves to form a pair of upwardly opening channels spaced opposite each other across the channel element and the means for locking the stair treads to risers are movable and removably connected to each of the channel elements.

6. The stair unit of claim 5 wherein the movable and removable means for locking each of the stair treads to riser pairs include a first plate member supported upon the leg extremities of a channel element, a second plate member spaced from the first plate member, the second plate member overlying the portion of the legs of a channel element forming the upwardly opening channels, and means for selectively drawing the first and second plate members together and for separating them whereby the stair treads may be removably secured to riser pairs.

7. The stair unit of claim 6 wherein a pair of movable and removable means are provided in each of the channel elements of each of the stair treads, one of each pair of movable and removable means is disposed in a first preselected position in the channel and is secured to a first riser element by adjustment of the means for selectively drawing the first and second plate members together and for separating them, another of each pair of movable and removable means is disposed in a second preselected position in the channel and is secured to a second riser element by adjustment of the means for selectively drawing the first and second plate members together and for separating them.

8. A molded stair tread comprising a body portion having a substantially flat uninterrupted top surface and a substantially smooth and uninterrupted leading edge, means on the bottom surface of the body portion of the stair tread defining a channel, cooperable means provided in the channel for coaction and engagement with a locking means for securing the stair tread to a riser, and locking means carried in the channel of the stair tread, the locking means being generally axially movable with respect to the axis of the channel and having adjustable portions to cooperate with the means in the channel for coaction and engagement with the locking means and a portion of a stair tread riser to accomplish the securement of the stair tread to the riser.

9. The stair tread of claim 8, including a plurality of channels having means therein for engagement with locking means and locking means carried in the channels.

10. A molded stair tread comprising a body portion having a substantially flat upper surface, means on the opposite surface of the body defining a channel, means provided in the channel to slidably and removably retain at least a portion of a locking means within the channel, and a movable and removable means for locking the stair tread to a riser, the locking means including a first plate member retained within the channel by the locking means retaining means, a second plate member spaced from the first plate member, the second plate member overlying the open end of the channel, and means for selectively drawing the first and second plate members together and for separating them to produce the cooperable and removable securement of the stair tread to a riser.

11. The stair tread of claim 10 wherein the legs defining the pair of upwardly opening and oppositely spaced channels provide a longitudinally extending slot and the second plate member is provided with a guide flange which projects into the slot between the upwardly extending legs when the first and second plates are joined by connecting means.

12. The stair tread of claim 10 wherein a pair of movable and removable means are provided in each of the channel elements of the stair tread, one of each pair of movable and removable means is disposed in a first preselected position in the channel and is secured to a first riser element by adjustment of the means for selectively drawing the first and second plate members together and for urging them apart, another of each pair of movable and removable means is disposed in a second preselected position in the channel and is secured to a second riser element by adjustment of the means for selectively drawing the first and second plate members together and for urging them apart.

References Cited

UNITED STATES PATENTS

| 1,713,582 | 5/1929 | Wilson | 52—191 |
| 2,939,309 | 6/1960 | Sitton | 52—189 |
| 3,114,220 | 12/1963 | Maddox | 52—486 |

OTHER REFERENCES

German Printed Application No. 1,158,232.

JOHN E. MURTAGH, Primary Examiner

U.S. Cl. X.R.

52—489, 710